No. 782,660. PATENTED FEB. 14, 1905.
P. J. HURLEY.
END GATE FASTENING.
APPLICATION FILED SEPT. 2, 1904.
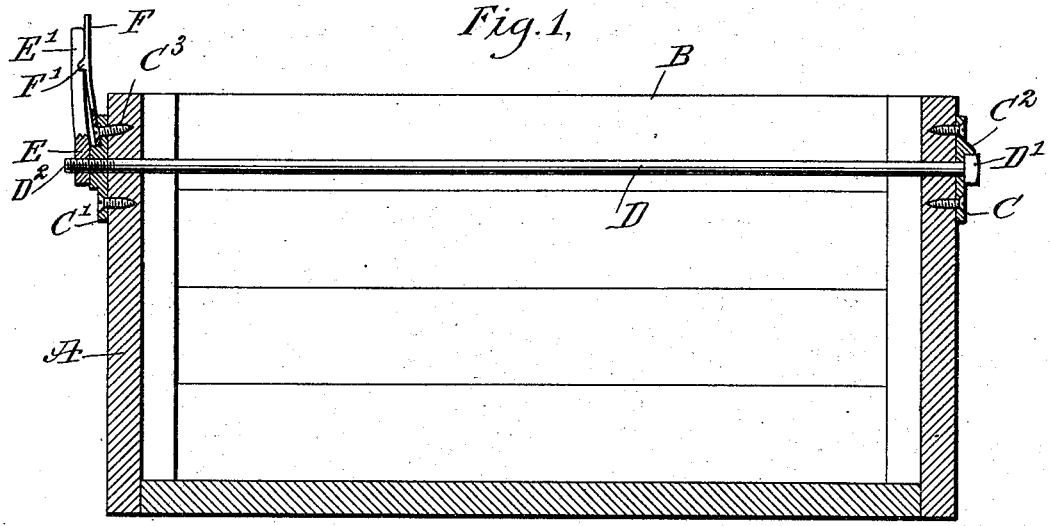
Fig. 1.
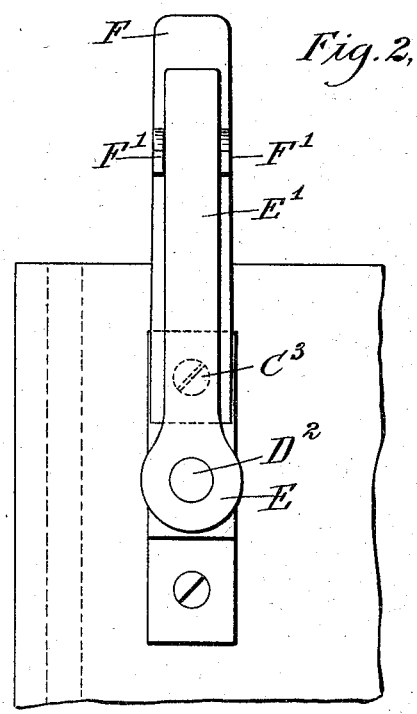
Fig. 2.
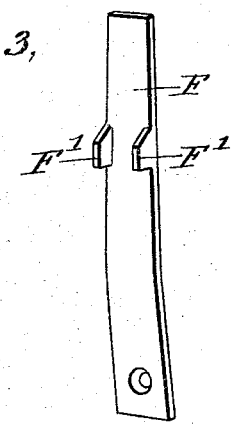
Fig. 3.
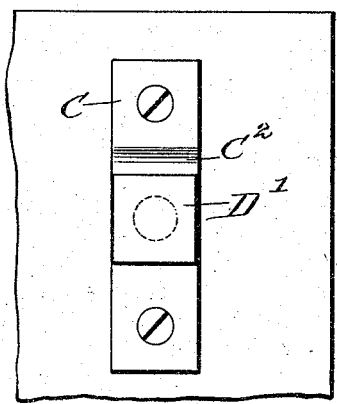
Fig. 4.
WITNESSES:
Edward Thorpe
Geo. J. Hostetz
INVENTOR
Patrick J. Hurley
BY 
ATTORNEYS No. 782,660.         Patented February 14, 1905.

UNITED STATES PATENT OFFICE.

PATRICK J. HURLEY, OF O'CONNOR, NEBRASKA.

END-GATE FASTENING.

SPECIFICATION forming part of Letters Patent No. 782,660, dated February 14, 1905.

Application filed September 2, 1904. Serial No. 223,084.

*To all whom it may concern:*

Be it known that I, PATRICK J. HURLEY, a citizen of the United States, and a resident of O'Connor, in the county of Greeley and State of Nebraska, have invented a new and Improved End-Gate Fastening, of which the following is a full, clear, and exact description.

The invention relates to end-gate fastenings using a transverse tie-rod; and its object is to provide a new and improved end-gate fastening which is simple and durable in construction and arranged to prevent the handled nut of the tie-rod from jarring loose, and to permit the operator to quickly unlock the nut whenever it is desired to unscrew the nut with a view to removing the end-gate.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a cross-section of a wagon-body provided with the improvement. Fig. 2 is an enlarged side elevation of the improvement as applied. Fig. 3 is a perspective view of the retainer for the handle of the nut, and Fig. 4 is a rear side elevation of the improvement as applied.

The wagon-body A is provided with an end-gate B of usual construction, and on the outer faces of the sides of the wagon-body A are secured bearings C C', through which extends a tie-rod D, also passing through the sides of the wagon-body A adjacent to the end-gate B, as plainly indicated in Fig. 1. The tie-rod D is provided at its rear end with a head D', preferably made polygonal and engaged at one side by a lug $C^2$, forming an integral part of the bearing C to prevent the tie-rod D from turning. The forward end $D^2$ of the tie-rod D is provided with screw-threads on which screws a nut E, having a suitable handle E', adapted to be taken hold of by the operator, to conveniently screw up the nut against the bearing C' whenever it is desired to clamp the end-gate B in place, and to allow of unscrewing the nut whenever it is desired to remove the end-gate B from the wagon-body. In order to hold the nut E against unscrewing or jarring loose after it is screwed up and the end-gate B is locked in place, a retaining device is provided, made in the form of a resilient plate F, provided near its free end with lugs F', engaging the sides of the handle E', as plainly indicated in the drawings, the said plate F being secured to the bearing C' by one of the screws $C^3$, employed for fastening the bearing C' to the corresponding side of the wagon-body A. The free end of the plate F projects slightly beyond the handle E' to permit the operator to conveniently take hold of the said end to press the plate rearwardly in order to disengage the lugs F' from the sides of the handle E' to allow the operator to unscrew the nut E whenever it is desired to remove the end-gate B. It is understood that the resiliency of the plate F holds the latter in contact with the rear face of the handle E', so that the lugs F' of the plate straddle the sides of the handle, and as the plate F is secured to the bearing C' it is evident that the nut is not liable to jar loose and unscrew on the threaded end $D^2$ of the tie-rod D, and hence the end-gate B is not liable to become loose and lost.

From the foregoing it will be seen that both the tie-rod D and the nut E are held against turning, and consequently the end-gate B is securely locked in place on the wagon-body A.

Having thus described my invention, I claim as new and desire to secure by Letters Patent—

1. An end-gate fastening comprising a tie-rod, a handled nut screwing thereon, and a manually-controlled resilient retainer for engaging the handle of the nut to hold the latter against unscrewing.

2. An end-gate fastening comprising a tie-rod, a handled nut screwing thereon, means for holding the tie-rod against turning, and a resilient plate provided with means for engaging the said handle of the nut.

3. An end-gate fastening comprising bearings on the wagon-body, a tie-rod extending through the said bearings, and threaded on one end, a handled nut screwing on the threaded end of the tie-rod and engaging one of said bearings, a spring-plate secured at one end on said bearing, and having lugs engaging the handle of the nut, the free end of said plate projecting beyond the handle, and means on the other bearing for engaging the head of the tie-rod to hold the tie-rod against turning.

4. An end-gate fastening comprising a tie-rod having a polygonal head on one end and a screw-thread on the other end, a handled nut screwing on the threaded end of the tie-rod, bearings on the wagon-body for the tie-rod to pass through, one of the bearings having a lug abutting against one side of the said polygonal head, and a resilient retainer secured on the other bearing and adapted to engage the handle of the said nut.

5. An end-gate fastening comprising a tie-rod having a polygonal head on one end and a screw-thread on the other end, a handled nut screwing on the threaded end of the tie-rod, bearings on the wagon-body for the tie-rod to pass through, one of the bearings having a lug abutting against one side of the said polygonal head, and a resilient retainer secured on the other bearing and adapted to engage the handle of the said nut, the said resilient retainer being in the form of a spring-plate fastened to the bearing by the screw employed for fastening the bearing to the wagon-body, the said plate have lugs for straddling the sides of the handle of the nut.

In testimony whereof I have signed my name to this specification in the presence of two subscribing witnesses.

PATRICK J. HURLEY.

Witnesses:
   M. R. FOGARTY,
   T. J. HOWARD.